United States Patent [19]
Gregoire

[11] 3,917,360
[45] Nov. 4, 1975

[54] SNOWMOBILE TRACK

[75] Inventor: Marc Gregoire, Ste-Henedine, Canada

[73] Assignee: Elast-O-Flex, Inc., Quebec, Canada

[22] Filed: Oct. 17, 1973

[21] Appl. No.: 407,224

[30] Foreign Application Priority Data
June 19, 1973 Canada.............................. 174,416

[52] U.S. Cl. ................................................. 305/30
[51] Int. Cl.² ......................................... B62D 55/08
[58] Field of Search........................... 305/35 EB, 38

[56] References Cited
UNITED STATES PATENTS
3,747,994  7/1973  Russ................................ 305/35 EB

*Primary Examiner*—Philip Goodman
*Assistant Examiner*—John A. Carroll

[57] ABSTRACT

The disclosure herein describes an endless flexible track for a snowmobile or the like which comprises at least two laterally spaced and longitudinally extending strips of elastomeric material, a plurality of equidistantly spaced reinforcing members incorporated in the strips and extending transversely thereof, and cleat means mounted on the reinforcing members and defining with the space separating the strips at least one row of sprocket-teeth-receiving openings extending longitudinally of the track; each cleat means consists of an open-ended enclosure having a first passageway receiving therethrough a reinforcing member and a second passageway receiving therein an elastomeric material to provide a cushion effect between the enclosure and that portion of the reinforcing member in the enclosure during transversal flexion of the reinforcing member as it is entrained over the sprockets; the elastomeric material of the cleat means is integral with the elastomeric material of the strips to provide a mechanical connection between the elastomeric material of adjacent strips.

6 Claims, 6 Drawing Figures

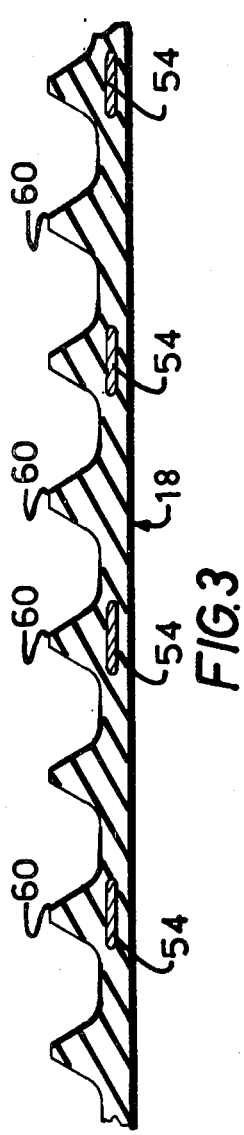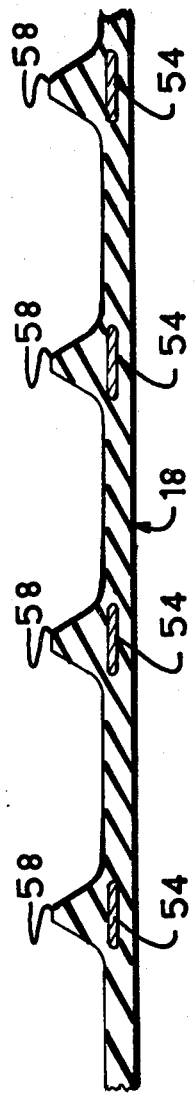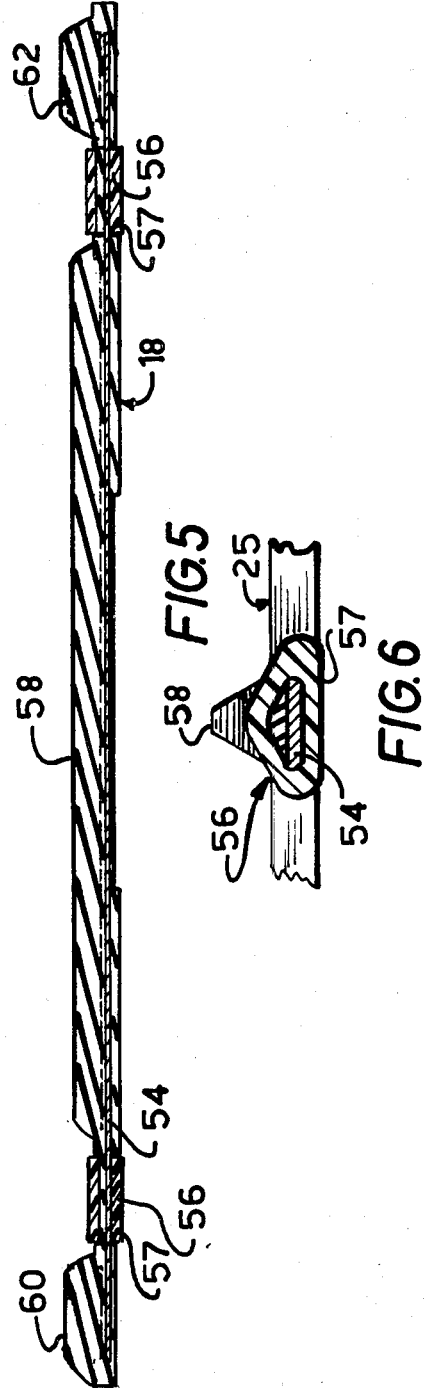

SNOWMOBILE TRACK

FIELD OF THE INVENTION

The present invention relates to tracks for self-propelled vehicle; more particularly, this invention pertains to an improvement in the manufacture of endless flexible tracks of the type normally used for driving snowmobiles or the like.

BACKGROUND OF THE INVENTION

Tracks, presently available for propelling snow vehicles, are generally made of a thin elastomeric material having a flat inner surface and a corrugated outer surface. The endless track is looped around one or more idler sprocket wheels and one or more drive sprocket wheels, the teeth of the sprockets being received in longitudinal rows of openings extending through the track. To increase the rigidity of the track in its lateral extent to withstand the driving force of the drive sprocket teeth, a series of transverse reinforcing members are embedded, or partially embedded, in the elastomeric material. To prevent wear due to friction between the sprocket teeth and the elastomeric material, a metal member is usually clipped about the material extending between adjacent openings; in other cases, the metal clips are partially embedded in the elastomeric material with front and rear portions extending outside the material to provide wear surfaces. In each case, however, track replacements or repairs resulting from continuous frictional contact between the sprocket teeth and gradually corroding clips are inevitable as the clips are easily distorted thereby damaging the track material or become easily dislodged from the clipping position.

Also, it can be observed that the transverse reinforcing members, as they pass over the sprockets, take an outwardly projecting bend in the transverse direction of the track; since these members are fixed to the elastomeric material at the clip locations, frequent damage of these members is being observed at these points due to excessive transversal flexion of these members.

It is an object of the present invention to provide a snowmobile track wherein the transverse reinforcing members are allowed to bend with the track as they are entrained around the drive and idler sprockets of the snowmobile.

It is another object of the present invention to provide a snowmobile track wherein cleats mounted on these reinforcing members are free from corrosion and suitably adapted to be engaged by the sprocket teeth.

Another object of the present invention is the provision of a snowmobile track which is economical and lighter in weight as a result of requiring less elastomeric material and using a cleat material which is lighter than the conventional metal clip.

SUMMARY OF THE INVENTION

The present invention relates to an endless driving track for use in a snowmobile or the like and adapted to be entrained around the front and rear sprockets of the snowmobile comprising: at least two laterally spaced and longitudinally extending continuous strips of elastomeric material having inner and outer surfaces; a plurality of equidistantly spaced reinforcing members incorporated in the strips and extending transversely thereof; and cleat means mounted on the reinforcing members and defining with the spaced strips at least one row of sprocket-teeth-receiving openings extending longitudinally of the track, each cleat means including an open-ended enclosure having a first passageway receiving a reinforcing member therethrough and a second passageway receiving an elastomeric material therein to provide a cushion effect for a transversal flexion of the reinforcing member as it is entrained around the sprockets, the elastomeric material in the cleat means being integral with the elastomeric material of adjacent strips to provide a mechanical connection between said adjacent strips.

In one preferred form of the invention, the cleat means are made of an anti-shock and anti-wear plastic material such as nylon, polycarbonate or polyethylene.

In another form of the invention, the outer surface of the track has a novel configuration to provide maximum gripping action on icy surfaces as well as in soft snow.

BRIEF SUMMARY OF THE DRAWINGS

Other objects, purposes and characteristics of the present invention will be in part obvious from the accompanying drawings, and in part pointed out as the description of the invention progresses. In describing the invention in details, reference will be made to the accompanying drawings, in which like reference characters designated corresponding parts throughout the several views, and in which:

FIG. 3 is a schematic longitudinal cross-sectional view taken along lines 3—3 of FIG. 1;

FIG. 4 is a schematic longitudinal cross-sectional view taken along lines 4—4 of FIG. 1;

FIG. 5 is a schematic transverse cross-sectional view taken along lines 5—5 of FIG. 1; and FIG. 6 is a cross-sectional view taken along lines 6—6 of FIG. 1 and illustrating the cleat means.

Referring to FIG. 1 of the drawings, a portion of an endless flexible track is shown and is generally denoted by numeral 14. The track has an outer ground contacting surface 16 provided with a tread, the novel configuration of which will be described hereinbelow. The track has also an inner peripheral surface 18 (see FIGS. 3–5) which is generally flat to receive the wheels or slides of the snowmobile's suspension assembly (not shown).

The track illustrated in FIG. 1 displays two laterally spaced rows of aligned sprocket-teeth-receiving openings 20 and 22 which extend longitudinally of the track and divide the track into three longitudinally extending strips of elastomeric material 24, 25 and 26. FIG. 2 shows the lay-up for forming such a track.

Figure 1:
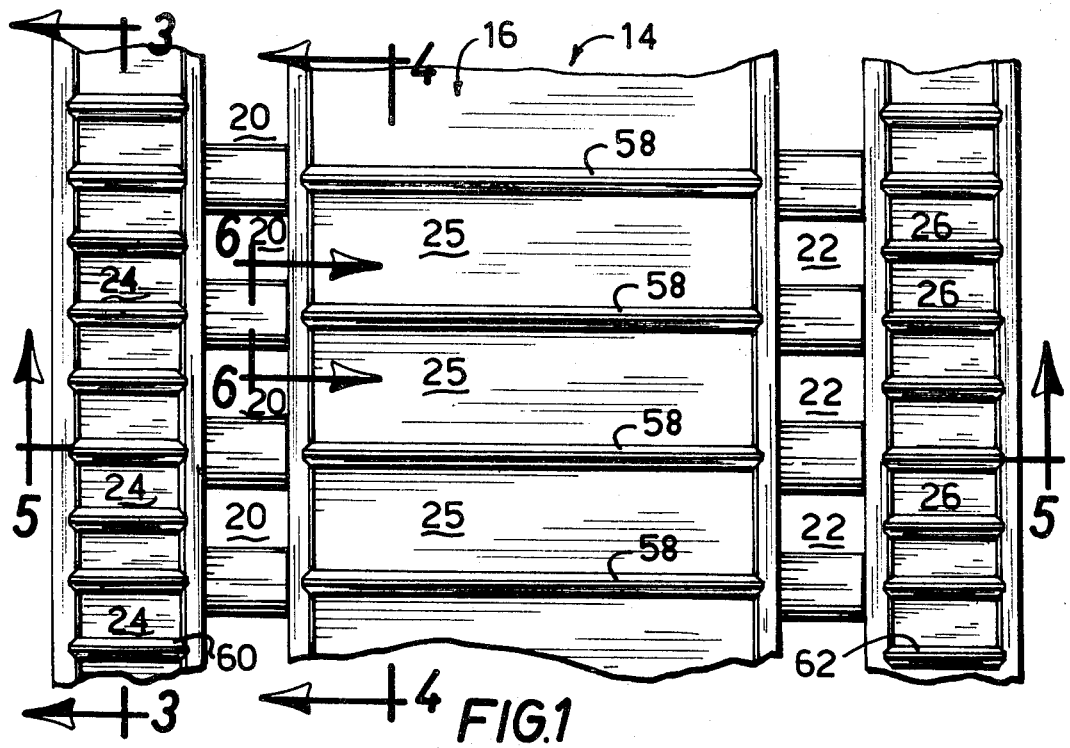
FIG. 1 is a fragmentary plan view of one form of a track constructed according to the present invention.
Figure 2:
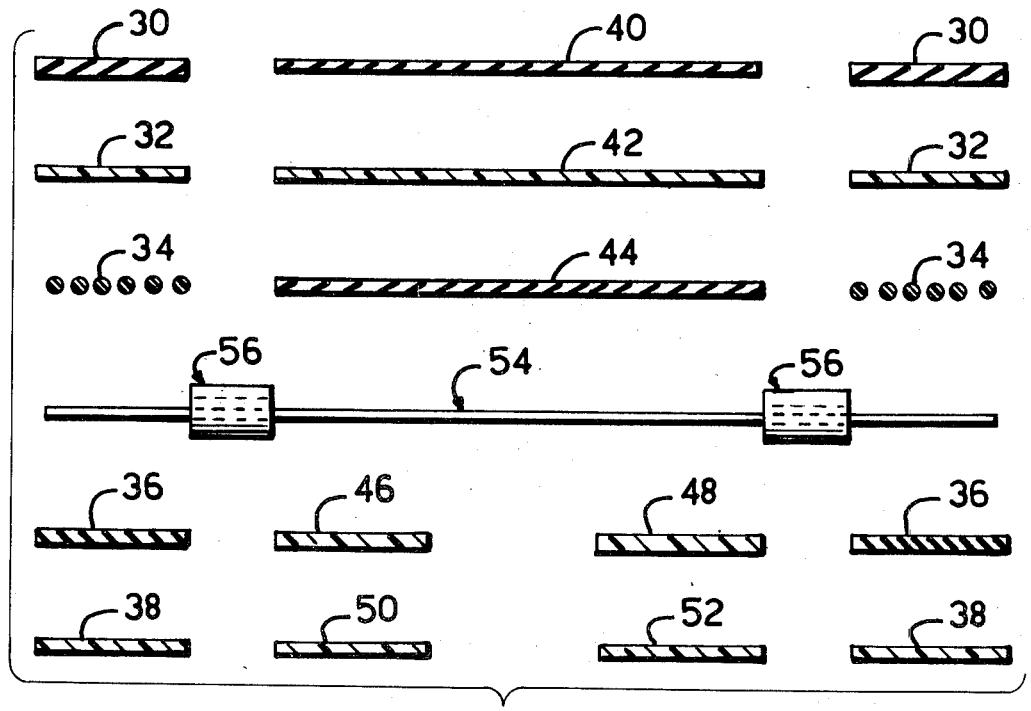
FIG. 2 is an exploded cross-sectional view showing the lay-up of a track similar to that shown on FIG. 1.

Each lateral portion 24, 26 includes an outer layer 30 of rubber followed by a layer of wooven nylon 32, a layer of longitudinally extending steel cables 34, a second layer of rubber 36 and a second layer of wooven nylon 38.

The central portion 25 of the track is made of a first layer of rubber 40 followed by a layer of wooven nylon 42 and by a second layer of rubber 44. Then, the central portion terminates on its inner side with two laterally spaced strips of rubber 46 and 48 and two laterally spaced strips of wooven nylon 50 and 52. The detailed specification of each material used in making up the track described above is considered well known by persons skilled in the art. For example, the steel cables 34 may also be made of polyester or fiber glass.

A series of reinforcing members 54 extend transversally of the track at spaced intervals along the longitudinal direction of the track. This member 54 is a flat rigid bar of rectangular cross-section; however, the shape of this reinforcing member may be modified in various ways, as it is well known by the person skilled in this art. The present invention is, therefore, not limited to the particular shape of the reinforcing member shown in the drawings.

An important feature of the present invention is the provision of cleat means 56 mounted on the reinforcing member 54 and located thereon in the space between adjacent strips of elastomeric material. Each cleat means 56 consists of a hollow open-ended enclosure which is pressed fitted on the reinforcing member 54 prior to vulcanization of the different layers of rubber and nylon fabrics with the reinforcing member 54. This vulcanization consists in curing under pressure the said layers in the mould of a vulcanizer to form an endless elastomeric track.

The particular configuration of the hollow cleat is important and consists of a first passageway which receives the reinforcing member 54 therethrough and a second passageway situated over the first passageway to receive, during vulcanization, a flow of the curing elastomeric material which fills the area between the top surface of the reinforcing member 54 and the inner surface of the hollow cleat 56 (see FIG.6). The lower outer surface 57 of cleat 56 is generally flat and extends at least in the same plane as the inner surface 18 of the elastomeric material; surface 57 serves to contact the sprockets of the snowmobile when entrained therearound. Also, on snowmobiles equipped with slide rail suspensions they provide good sliding faces for the slide rails.

There are considerable advantages in using a cleat made in accordance with the present invention. To remediate the problem of breakage of the reinforcing members to the transversal flexion of the member as the track is entrained around the sprockets, the elastomeric material located inside the cleat provides a cushion effect or absorbing action to this flexion. Secondly, the central portion 25 of the track is lined to the lateral portions 24 and 26 by the reinforcing members 54; the addition of an elastomeric material inside the cleat provides a mechanical connection or bond between the elastomeric material of the central portion 25 and the elastomeric material of adjacent respective lateral portions 24 and 26.

Also, the provision of elastomeric material in the enclosure 56 results in less wear on the sprockets driving the track since there is less resistance by the track to the driving action of the sprockets.

In a preferred form of the invention, the cleats 56 are made of an anti-shock, anti-wear plastics material such as nylon, polycarbonate, polyethylene or the like. Satisfactory results have been obtained with cleats made of nylon Zytel 408 (trademark). The provision of cleats made of plastics material evidently results in a lighter track. For example, on a track having two rows of longitudinally extending openings, the reduction in weight is approximately 25% in comparison with a track equipped with cleats made of steel. Also, the provision of a lighter track has a direct impact on the performance of the snowmobile in addition to reducing the cost of such track.

There are also other advantages in making a track in accordance with the present invention; for example, during manufacturing, presses are no longer required for clipping the steel cleats at their proper location on the track.

Referring to FIG. 1, the outer surface of the track has a tread design consisting of a series of transverse ribs 58 provided in a central longitudinal portion 25 and of a series of transverse ribs 60 and 62 respectively provided in the lateral portions 24 and 26. The tread is configured for maximum traction on icy surfaces as well as in deep snow. To achieve this, the plane extending through the apexes of the transverse ribs 60 and 62 extends above the plane passing through the apexes of the transverse ribs 58 of the central portion 25 (see FIGS. 3–5). With this achievement, better traction is obtained on icy surfaces since only the lateral portions 24 and 26 are in contact with the terrain over which the snowmobile track runs. There is evidently less sliding when the central portion 25 is not in contact with the terrain. Both lateral portions being parallel, the steering control is maintained. On the other hand, in deep snow, the entire outer surface of the track is in contact with the terrain thereby providing maximum traction for the snowmobile track.

In one particular form, the ratio of number of ribs in the lateral portions to the number of ribs in the central portion is 3:2.

Although the invention as been described above in connection with specific forms of the invention, it will be evident to the man skilled in the art to modify and refine the invention in various ways. For example, the reinforcing members may be made of fiberglass, in which case the cleats could also be made of fiberglass and the manufacturing process of mounting the cleats on the reinforcing members could be reduced to a single step, that is to mould the cleats and the reinforcing member at the same time.

Also, the track shown is one with two rows of holes; however, it is well known in the art that snowmobile tracks with only one row of holes can be provided. Furthermore, it is wished to have it understood that, although there may be some advantages in using cleats made of plastics material, the present invention also includes cleats made of metal, such as aluminum, which are structured as described hereinabove. It is therefore wished to have it understood that this invention is not limited in interpretation except by the terms of the following claims.

I claim:

1. An endless driving track for use in a snowmobile or the like and adapted to be entrained around front and rear sprockets of the snowmobile, comprising: a central portion comprising a continuous strip of elastomeric material having inner and outer surfaces, at least two lateral portions comprising continuous strips of elastomeric material laterally spaced and longitudinally extending relative to said central strip having inner and outer surfaces; a plurality of equidistantly spaced reinforcing members incorporated in said strips and extending transversely thereof; and cleat means mounted on the reinforcing members and defining with said spaced strips at least one row of sprocket-teeth-receiving openings extending longitudinally of the track, each of said cleat means comprising a cleat member having interior walls defining an opening extending transversely through said cleat member, said walls further defining upper and lower portions within said opening, said walls defining said lower portion tightly engaging the side and bottom portions of said reinforcing means extending transversely through said at least one row portion of said track so as to prevent rotation of said cleat means about said reinforcing means, said walls defining said upper portion being spaced from the top portion of said reinforcing means, elastomeric material extending within said upper portion so as to engage the top portion of said reinforcing means, the walls defining said upper portion and the strips of elastic material so as to be integral therewith, said elastomeric material within said upper portion providing a flexible cushion for adsorbing forces applied to said track during use.

2. A snowmobile track as defined in claim 1 wherein said cleat member is made of plastics material and pressed fitted on said reinforcing member.

3. A snowmobile track as defined in claim 2 wherein said plastics material is one choosen from the group including nylon, polycarbonate and polyethylene.

4. A snowmobile track as defined in claim 1 wherein said outer surface has a tread design defined by a first series of transverse ribs in said central portion and a second series of transverse ribs in said lateral portions, the apexes of the ribs of said second series extending in a plane beyond the plane including the apexes of said first series of ribs in said central portion to provide maximum gripping action of said track on icy surfaces as well as in deep snow.

5. A snowmobile track as defined in claim 1 wherein said elastomeric material in said lateral portions consists of a first layer of rubber material defining said outer surface in said lateral portions, followed by a layer of wooven nylon, a layer of longitudinally extending cables, a second layer of rubber material and a second layer of wooven nylon; said elastomeric material in said central portion defining a first layer of rubber material defining the outer surface in said central portion, followed by a first layer of wooven nylon and a second layer of rubber material; said central portion further comprising second and third layers of wooven nylon disposed beneath said reinforcing member.

6. A snowmobile track as defined in claim 1 wherein said reinforcing members are rectangular in cross-secion and wherein the cross-section of said upper portion is generally triangular.

* * * * *